(12) United States Patent
Lin et al.

(10) Patent No.: US 11,522,468 B2
(45) Date of Patent: Dec. 6, 2022

(54) DIRECT-CURRENT GENERATOR BASED ON DYNAMIC SEMICONDUCTOR HETEROJUNCTION, AND METHOD FOR PREPARING SAME

(71) Applicant: ZHEJIANG UNIVERSITY, Hangzhou (CN)

(72) Inventors: Shisheng Lin, Hangzhou (CN); Yanghua Lu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/319,110

(22) Filed: May 13, 2021

(65) Prior Publication Data

US 2021/0344285 A1    Nov. 4, 2021

Related U.S. Application Data

(63) Continuation of application No. PCT/CN2019/110024, filed on Oct. 8, 2019.

(51) Int. Cl.
*H02N 1/04* (2006.01)

(52) U.S. Cl.
CPC ................... *H02N 1/04* (2013.01)

(58) Field of Classification Search
CPC .. G21H 1/06; H02N 1/04; H02N 1/06; H02N 1/08; H02N 1/10; H02N 1/12
(Continued)

(56) References Cited

U.S. PATENT DOCUMENTS

| | | | |
|---|---|---|---|
| 10,079,561 | B1 | 9/2018 | Boyd |
| 2007/0138905 | A1 | 6/2007 | Axelrod et al. |

(Continued)

FOREIGN PATENT DOCUMENTS

| | | |
|---|---|---|
| CN | 102683573 A | 9/2012 |
| CN | 202818150 U | 3/2013 |

(Continued)

OTHER PUBLICATIONS

International Search Report (PCT/CN2019/110024); dated Jan. 6, 2020.

(Continued)

*Primary Examiner* — Ahmed Elnakib
(74) *Attorney, Agent, or Firm* — . W&G Law Group

(57) ABSTRACT

A direct-current generator based on dynamic semiconductor heterojunction and a method for manufacturing the same are provided. Direct-current generator includes a first semiconductor layer (1) and a second semiconductor layer (4); a first electrode (2) is provided on back surface of the first semiconductor layer (1), an insulating layer (3) is provided on front surface of the first semiconductor layer (1); a second electrode (5) is provided on a side of the second semiconductor layer (4); front surface of the first semiconductor layer and a bare side of the second semiconductor layer contact each other and are slidable relative to each other to form a dynamic semiconductor heterojunction direct-current generator; materials of the first semiconductor layer (1) and the second semiconductor layer (4) have different Fermi levels. The generator has high current density, and a generating voltage can increase by designing interface energy band and adding the insulating layer.

6 Claims, 4 Drawing Sheets

(58) Field of Classification Search
USPC .......................................... 310/303, 309, 310
See application file for complete search history.

(56) References Cited

U.S. PATENT DOCUMENTS

| | | | |
|---|---|---|---|
| 2011/0163242 A1 | 7/2011 | Mao et al. | |
| 2011/0163243 A1* | 7/2011 | Iwata | G21K 1/093 |
| | | | 250/396 ML |
| 2016/0294305 A1 | 10/2016 | Kim et al. | |
| 2021/0344285 A1* | 11/2021 | Lin | H02N 1/04 |

FOREIGN PATENT DOCUMENTS

| | | | |
|---|---|---|---|
| CN | 103354429 A | | 10/2013 |
| CN | 103779885 A | | 5/2014 |
| CN | 103780124 A | | 5/2014 |
| CN | 104467516 A | | 3/2015 |
| CN | 105679861 A | | 6/2016 |
| CN | 105720127 A | | 6/2016 |
| CN | 106611652 A | | 5/2017 |
| CN | 207835364 U | | 9/2018 |
| CN | 109037352 A | | 12/2018 |
| CN | 109672367 A | | 4/2019 |
| CN | 109921687 A | | 6/2019 |
| CN | 112152509 | * | 12/2020 |
| CN | 113783471 | * | 12/2021 |
| JP | 2011054685 A | | 3/2011 |

OTHER PUBLICATIONS

Search Report (2018113485776).
Search Report (2019100024174).

\* cited by examiner

DIRECT-CURRENT GENERATOR BASED ON DYNAMIC SEMICONDUCTOR HETEROJUNCTION, AND METHOD FOR PREPARING SAME

TECHNICAL FIELD

The present disclosure belongs to a field of new green renewable energy acquisition technology, and relates to a direct-current generator based on dynamic semiconductor heterojunction and a method for manufacturing the same.

BACKGROUND

Nowadays, with the rapid development of electronic products and the increasing seriousness of environmental pollution and energy crisis, people begin to seek for miniature, portable green and clean energy to replace conventional lithium batteries, electromagnetic generators, solar generators, etc., to provide energy for electronic devices. In recent years, as a new, renewable, miniature and portable green energy device, a nanogenerator has gradually come into view, become a new focus in the research field and application aspect, and attracted extensive attention from academia and industry. The nanogenerator can convert a variety of natural and green energy in nature, such as wind energy, mechanical energy and tidal energy, into electric energy for output, so as to provide energy for electronic devices without being limited by environmental factors, which, to a large extent, can reduce a negative impact of environmental pollution and alleviate the energy crisis. However, due to the limitations of the material, the structure and the working principle, its current and power for power generation are not high enough, and the output of an alternating-current electrical signal requires an external rectifier circuit and an energy storage circuit, which is not conducive to miniaturization.

In recent years, the rapid development of intelligent wearable devices, human health real-time health systems, etc., has put forward new demands for new in-situ energy with miniaturization, high power density and lightness. In the present disclosure, a direct-current generator based on dynamic semiconductor heterojunction is obtained by using contact movement between two semiconductor materials with different Fermi levels. Lateral movement of heterojunction in a junction region may break the diffusion-drift current balance of a built-in electric field. As a result, diffusion charges bounce directionally under a high-intensity built-in electric field to generate a current, so as to directly convert external mechanical energy into direct-current energy. Under an extremely strong built-in electric field, the density of an operation current thereof is increased by two orders of magnitude compared with a conventional friction generator. Further, the performance such as a generating voltage can be greatly increased by designing an interface energy band and adding a particular insulating layer. The generator requires simple and common materials, has a simple device structure and process flow, and is low-cost, with high power density conducive to the micro integrated design of the device, and can supply power to an electronic circuit system in real time without an external rectifier circuit and an energy storage circuit, so the generator can be widely used in many extreme environments, special medical needs and other scenarios.

SUMMARY

An objective of the present disclosure is to provide a direct-current generator based on dynamic semiconductor heterojunction and a method for manufacturing the same.

In the direct-current generator based on dynamic semiconductor heterojunction according to the present disclosure, the direct-current generator includes a first semiconductor layer and a second semiconductor layer; a first electrode is provided on a back surface of the first semiconductor layer; a second electrode is provided on a front surface of the second semiconductor layer; a front surface of the first semiconductor layer and a back surface of the second semiconductor layer contact each other by means of an insulating layer (3) provided on a front surface of the first semiconductor layer (1) and are slidable relative to each other to form a dynamic semiconductor heterojunction direct-current generator; and a Fermi level of a material of the first semiconductor layer is different from a Fermi level of a material of the second semiconductor layer.

In the above technical solution, each of the first semiconductor layer and the second semiconductor layer is made of a material selected from a group consisting of silicon, gallium arsenide, indium gallium arsenide, zinc oxide, germanium, cadmium telluride, gallium nitride, indium phosphide, and the following two-dimensional layered semiconductor materials: molybdenum disulfide, black phosphorus, tungsten diselenide, molybdenum disulfide, molybdenum diselenide and tungsten disulfide.

The insulating layer is made of a material selected from a group consisting of silicon dioxide, silicon nitride, aluminum oxide, aluminum nitride, boron nitride, hafnium oxide and other insulating materials, with a thickness smaller than or equal to 500 nm, preferably no more than 200 nm.

Each of the first electrode and the second electrode is a composite electrode, which is made of one or more material selected from a group consisting of gold, palladium, copper, silver, titanium, chromium, nickel, platinum and aluminum, with a thickness ranging from 1 nm to 500 nm.

The direct-current generator based on dynamic semiconductor heterojunction can convert any one of wind energy, tidal energy, human kinetic energy, mechanical energy and ocean energy into an electrical signal.

The direct-current generator based on dynamic semiconductor heterojunction can generate a direct-current electrical signal without an external rectifier circuit, and has extremely high current density, which is several orders of magnitude higher than other nanogenerators.

A method for manufacturing the direct-current generator based on dynamic semiconductor heterojunction described above, includes steps of:

1) manufacturing the first electrode on the back surface of the first semiconductor;

2) growing the insulating layer on the front surface of the first semiconductor;

3) manufacturing the second electrode on a back surface of the second semiconductor;

4) pressing a front surface of the second semiconductor onto a surface of the insulating layer of the first semiconductor to form a slidable contact, so as to obtain the direct-current generator based on dynamic semiconductor heterojunction, and moving the two semiconductor layers relative to each other to generate the direct-current electrical signal.

Compared with the prior art, the present disclosure has the following beneficial effects.

Compared with the conventional nanogenerator, the direct-current generator based on dynamic semiconductor heterojunction according to the present disclosure does not require any piezoelectric semiconductor material, so material selection is expanded. Compared with the conventional electromagnetic generator, the direct-current generator can obtain a direct current without needing a coil and an external rectified current and can directly power an external circuit, which operates stably, has simple process steps and device structure, and is conducive to micro integration. Compared with the conventional solar cells, the direct-current generator can generate electricity anytime and anywhere in all weathers without light. The principle and the structure are initiative, and are advanced. The direct-current generator based on dynamic semiconductor heterojunction is obtained by using contact-type relative movement of two semiconductor materials with different Fermi levels, which overcomes the limitations of the material, the structure and the working principle. Under an extremely strong built-in electric field, a dynamic heterojunction generator can obtain extremely high current density, which is 2-3 orders of magnitude higher than the conventional nanogenerator. Further, a generating voltage can be greatly increased by designing an interface energy band and inserting an intermediate insulating layer, thereby powering original electronic devices in real time.

DESCRIPTION OF EMBODIMENTS

The present disclosure is further described in the following with reference to the accompanying drawings and specific embodiments.

Figure 1:
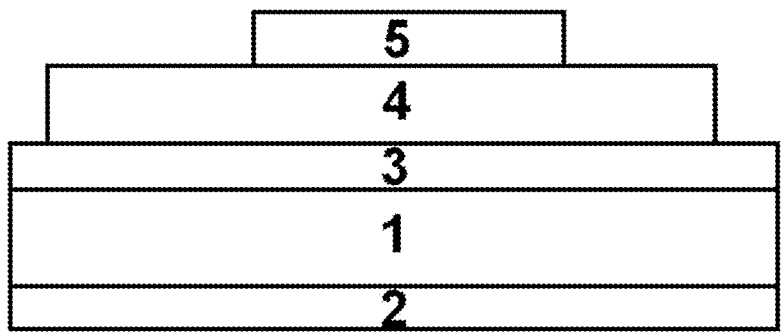
FIG. 1 is a schematic structural diagram of a direct-current generator based on dynamic semiconductor heterojunction.

Referring to FIG. 1, in a direct-current generator based on dynamic semiconductor heterojunction according to the present disclosure, firstly, a first electrode 2 is manufactured on a back surface of a first semiconductor material layer 1, and an insulating layer 3 is grown on a front surface of a first semiconductor material layer 1; then, a second electrode 5 is manufactured on a back surface of a second semiconductor material layer 4; and finally, a surface of the insulating layer manufactured on the first semiconductor material layer 1 is pressed to a front surface of the second semiconductor material layer 4 to form a movable mutual contact, so as to obtain the direct-current generator based on dynamic semiconductor heterojunction. Direct current output can be obtained through relative movement of the two semiconductor layers. For the direct-current generator based on dynamic semiconductor heterojunction according to the present disclosure, different semiconductors contact each other to form a built-in potential. Lateral movement of heterojunction in a junction region may break a diffusion-drift current balance of a built-in electric field. As a result, diffusion charges bounce directionally under a high-intensity built-in electric field to generate a current, so as to directly convert external mechanical energy into direct-current energy, and renewable and clean energy can be provided for a variety of electronic devices and products without an external rectifier or energy storage circuit. Compared with the conventional electromagnetic induction generator and nanogenerator, the generator does not require the addition of a large-sized coil and has extremely high current density, and can be used to produce lightweight miniature and portable in-situ energy. Further, the performance such as a generating voltage can be greatly increased by designing an interface energy band and adding a particular insulating layer, so as to successfully directly power original devices. The generator requires simple and common materials, has a simple device structure and process flow, and is low-cost, so, in the future, the generator has a broad development prospect in the field of in-situ energy supply of electronic circuit systems such as intelligent wearable devices and human health real-time monitoring.

Example 1

1) An electrode was manufactured on a back surface of a P-type doped silicon wafer, the electrode is made of 20-nm titanium/50-nm gold, and then an obtained sample was sequentially immersed in acetone and isopropanol for surface cleaning. The sample was cleaned with deionized water and then taken out and dried.

2) No insulating layer was grown on a front surface of the P-type doped silicon wafer.

3) An electrode was manufactured on a back surface of an N-type doped gallium arsenide wafer, the electrode was made of 20-nm titanium/50-nm gold, and then an obtained sample was sequentially immersed in acetone and isopropanol for surface cleaning. The sample was cleaned with deionized water and then taken out and dried.

4) The N-gallium arsenide wafer was pressed onto the P-silicon wafer, and the two wafers contact each other and move relative to each other to obtain a direct-current generator based on dynamic semiconductor heterojunction, to generate an electrical signal.

Figure 2:
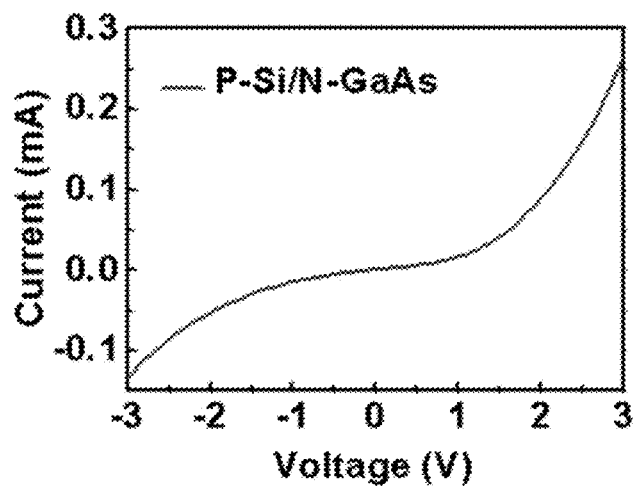
FIG. 2 shows a static I-V curve of a direct-current generator based on dynamic P-silicon/N-gallium arsenide heterojunction.
Figure 3:
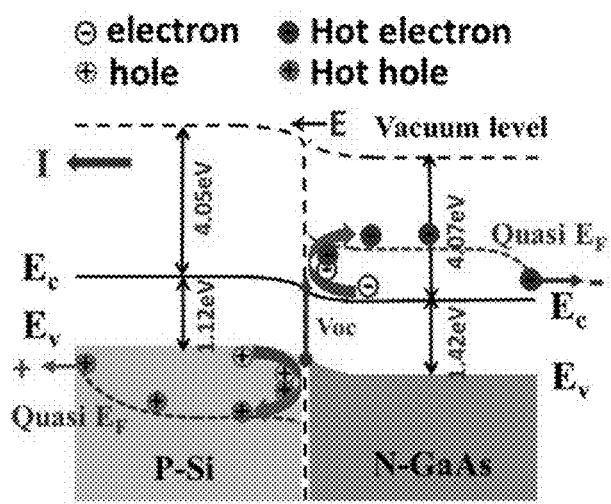
FIG. 3 is a diagram of an energy band based on dynamic P-silicon/N-gallium arsenide heterojunction.
Figure 4:
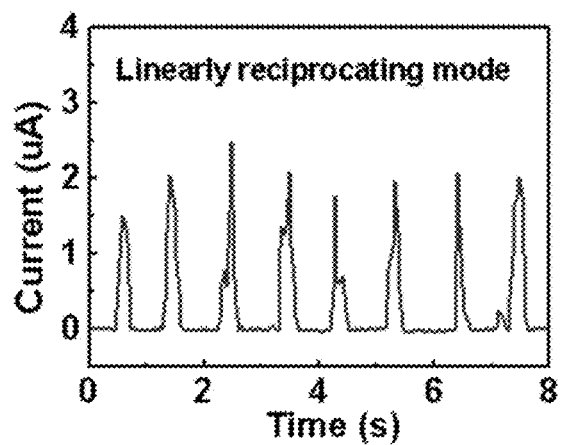
FIG. 4 is a graph of current output versus time of a direct-current generator based on dynamic P-silicon/N-gallium arsenide heterojunction.

The N-gallium arsenide wafer was pressed onto the P-silicon wafer, and the two wafers contact each other and move relative to each other to obtain the dynamic P-silicon/N-gallium arsenide heterojunction direct-current generator, that is, a direct-current generator based on dynamic heterojunction. A static I-V curve of the P-silicon/N-gallium arsenide heterojunction direct-current generator was as shown in FIG. 2, and the two wafers contact each other to form a built-in electric field, which had rectification characteristics. As shown in FIG. 3, relative movement of silicon and gallium arsenide may break the diffusion-drift current balance of the built-in electric field. As a result, diffusion electrons and holes bounced back to gallium arsenide and silicon, respectively, to generate a current under a high-intensity built-in electric field, so as to directly convert external mechanical energy into direct-current energy. As shown in FIG. 4, a direct current generated was about 2 μA, a voltage generated was about 0.7 V, and the current density was 2 A/m$^2$.

Example 2

1) An electrode was manufactured on a back surface of a P-type doped silicon wafer, the electrode was made of 10-nm titanium/100-nm gold, and then an obtained sample was sequentially immersed in acetone and isopropanol for surface cleaning. The sample was cleaned with deionized water and then taken out and dried.

2) A layer of 20-nm silicon dioxide was grown on a front surface of the P-type doped silicon wafer.

3) An electrode was manufactured on a back surface of an N-type doped gallium arsenide wafer, the electrode was made of 10-nm chromium/100-nm gold, and then an obtained sample was sequentially immersed in acetone and isopropanol for surface cleaning. The sample was cleaned with deionized water and then taken out and dried.

4) The N-gallium arsenide wafer was pressed onto the P-silicon wafer on which a layer of 20-nm silicon dioxide was grown, and the two wafers contact each other and move relative to each other to obtain a direct-current generator based on dynamic heterojunction, to generate an electrical signal.

Figure 5:
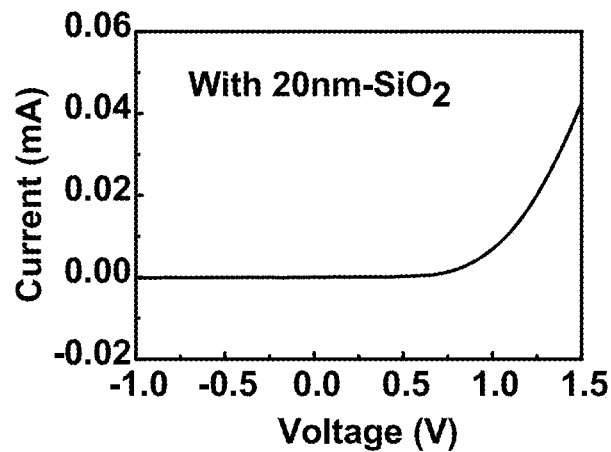
FIG. 5 shows a static I-V curve of a direct-current generator based on dynamic P-silicon/200-nm silicon dioxide/N-gallium arsenide heterojunction.
Figure 6:
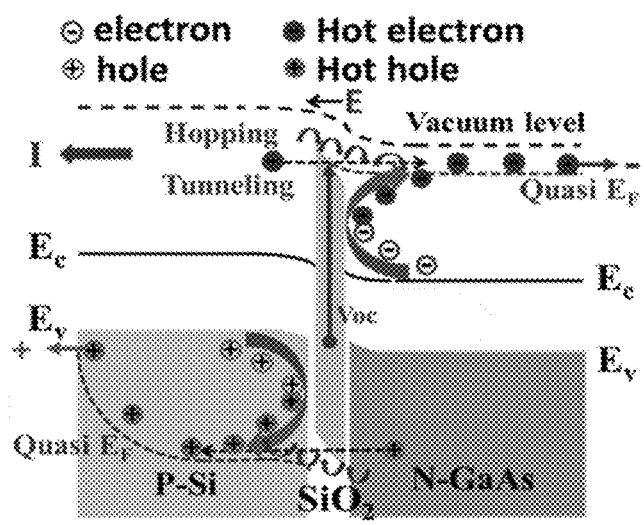
FIG. 6 is a diagram of an energy band of a direct-current generator based on dynamic P-silicon/silicon dioxide/N-gallium arsenide heterojunction.
Figure 7:
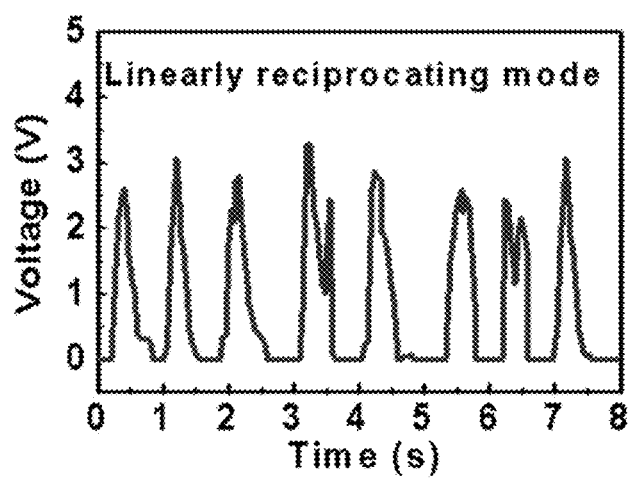
FIG. 7 is a graph of voltage output versus time of a direct-current generator based on dynamic P-silicon/200-nm silicon dioxide/N-gallium arsenide heterojunction.

In the dynamic P-silicon/silicon dioxide/N-gallium arsenide heterojunction direct-current generator, the N-gallium arsenide wafer was pressed onto the P-silicon wafer on which a layer of 20-nm silicon dioxide was grown, and the two wafers contact each other and move relative each other to output an electrical signal. A static I-V curve of the P-silicon/20-nm silicon dioxide/N-gallium arsenide heterojunction direct-current generator was as shown in FIG. 5, and two wafers contact each other to form a built-in electric field, which had better rectification characteristics. As shown in FIG. 6, compared with the P-silicon/N-gallium arsenide junction, with the addition of silicon dioxide, a height of an interface barrier increased, which intensified the rebound of interface diffusion charges, thereby increasing an output voltage. A voltage generated was about 2.5 V (FIG. 7). A direct current generated was about 1.2 μA, and the current density was 1.2 A/m$^2$.

Example 3

1) An electrode was manufactured on a back surface of a P-type doped silicon wafer, the electrode was made of 30-nm titanium/70-nm gold, and then an obtained sample was sequentially immersed in acetone and isopropanol for surface cleaning. The sample was cleaned with deionized water and then taken out and dried.

2) No insulating layer was grown on a front surface of the P-type doped silicon wafer.

3) An electrode was manufactured on a back surface of an N-type doped silicon wafer, the electrode was made of 100-nm silver, and then an obtained sample was sequentially immersed in acetone and isopropanol for surface cleaning. The sample was cleaned with deionized water and then taken out and dried.

Figure 8:
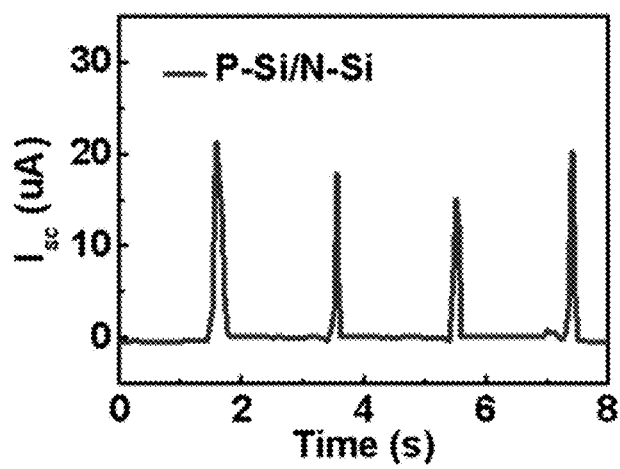
FIG. 8 is a graph of current output versus time of a direct-current generator based on dynamic P-silicon/N-silicon heterojunction.

4) The N-gallium arsenide wafer was pressed onto the P-silicon wafer, and the two wafers contact each other and move relative to each other to obtain a direct-current generator based on dynamic heterojunction, to generate an electrical signal. A direct current generated was about 20 μA, as shown in FIG. 8. A voltage generated was about 0.1 V, and the current density was 107 A/m$^2$.

Example 4

1) A back electrode was manufactured on a P-type doped silicon wafer, and the electrode was made of 50-nm silver. Then, an obtained sample was first placed into an acetone solution for cleaning, then the cleaning solution was poured out, then residual acetone was removed using an isopropanol solution, and finally the sample was rinsed with deionized water and then taken out and dried.

2) No insulating layer was grown on a front surface of the P-type doped silicon wafer.

3) A back electrode was manufactured on molybdenum disulfide, and the electrode was made of 50-nm silver.

4) Molybdenum disulfide was pressed onto the P-silicon wafer, and the two contact each other and move relative to each other to obtain a dynamic heterojunction direct-current generator, to generate an electrical signal.

Figure 9:
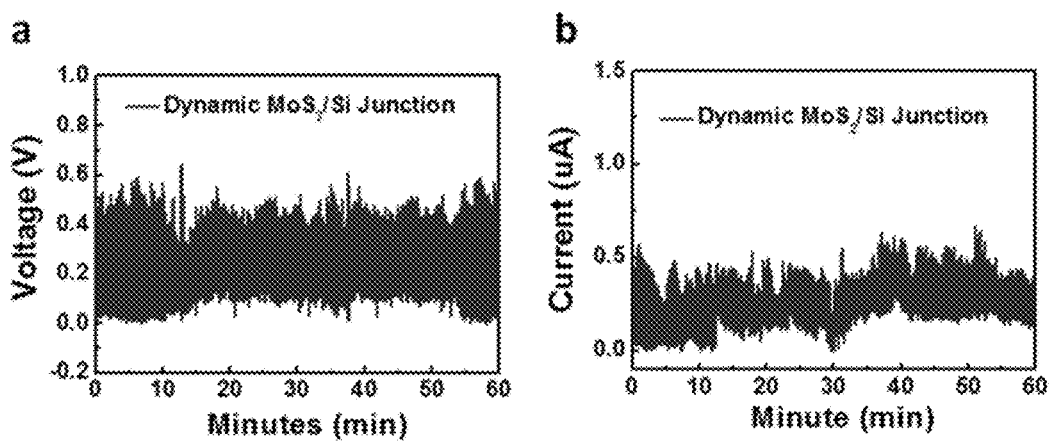
FIG. 9 shows graphs of current and voltage output versus time of a molybdenum disulfide/P-silicon heterojunction direct-current generator.

In the dynamic molybdenum disulfide/P-silicon heterojunction direct-current generator, molybdenum disulfide was pressed onto the P-silicon wafer, and the two contact each other and move relative to each other to obtain the dynamic heterojunction direct-current generator. Graphs of current and voltage output versus time of a molybdenum disulfide/P-silicon heterojunction direct-current generator were as shown in FIG. 9. It can be seen that the semiconductor material can be recycled to produce stable and continuous direct-current output.

Example 5

1) A back electrode was manufactured on a P-type doped silicon wafer, and the electrode was made of 5-nm titanium/50-nm gold. Then, an obtained sample was first placed into an acetone solution for cleaning, then the cleaning solution was poured out, then residual acetone was removed using an isopropanol solution, and finally the sample was rinsed with deionized water and then taken out and dried.

2) A layer of 5-nm AlN was grown as an insulating layer on a front surface of the P-type doped silicon wafer.

3) A back electrode was manufactured on molybdenum disulfide, and the back electrode was made of 10-nm titanium/50-nm gold.

4) Molybdenum disulfide was pressed onto the P-silicon wafer, and the two contact each other and move relative to each other to obtain a dynamic heterojunction direct-current generator, to generate an electrical signal.

Figure 10:
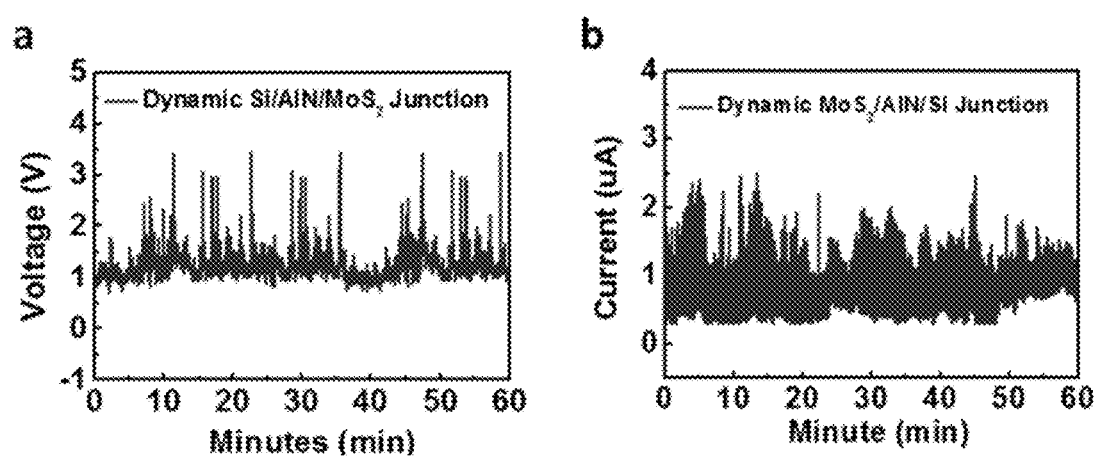
FIG. 10 shows graphs of voltage and current output versus time of a dynamic molybdenum di sulfide/AlN/P-sili con heterojunction direct-current generator.

In the dynamic Molybdenum disulfide/AlN/P-silicon heterojunction direct-current generator, molybdenum disulfide was pressed onto the P-silicon wafer on which a layer of 5-nm aluminum nitride was grown, and the two contact each other and move relative to each other to output the electrical signal. Graphs of voltage and current output versus time were as shown in FIG. 10, from which it could be found that the voltage was significantly increased after the addition of the insulating layer, and the voltage could be up to 5 V.

Example 6

1) An electrode was manufactured on a back surface of an N-type doped gallium nitride wafer, the electrode was made of 7-nm chromium/70-nm gold, and then an obtained sample was sequentially immersed in acetone and isopropanol for surface cleaning. The sample was cleaned with deionized water and then taken out and dried.

2) A layer of 50-nm aluminum oxide was grown on a front surface of the N-type doped gallium nitride wafer.

3) An electrode was manufactured on a back surface of a P-type doped silicon wafer, the electrode was made of 70-nm silver, and then an obtained sample was sequentially immersed in acetone and isopropanol for surface cleaning. The sample was cleaned with deionized water and then taken out and dried.

4) The P-silicon wafer was pressed onto the N-gallium nitride wafer, and the two wafers contact each other and move relative to each other to obtain a direct-current generator based on dynamic heterojunction, to generate an electrical signal.

Example 7

1) An electrode was manufactured on a back surface of an N-type doped silicon wafer, the electrode was made of 10-nm titanium/70-nm gold, and then an obtained sample was sequentially immersed in acetone and isopropanol for surface cleaning. The sample was cleaned with deionized water and then taken out and dried.

2) A layer of 10-nm silicon nitride was grown on a front surface of the N-type doped silicon wafer.

3) An electrode was manufactured on a back surface of a P-type doped silicon carbide wafer, the electrode was made of 60-nm gold, and then an obtained sample was sequentially immersed in acetone and isopropanol for surface cleaning. The sample was cleaned with deionized water and then taken out and dried.

4) The P-silicon carbide wafer was pressed onto the N-silicon wafer, and the two wafers contact each other and move relative to each other to obtain a direct-current generator based on dynamic heterojunction, to generate an electrical signal.

Example 8

1) An electrode was manufactured on a back surface of an N-type doped gallium nitride wafer, the electrode was made of 15-nm chromium/55-nm gold, and then an obtained sample was sequentially immersed in acetone and isopropanol for surface cleaning. The sample was cleaned with deionized water and then taken out and dried.

2) A layer of 100-nm aluminum oxide was grown on a front surface of the N-type doped gallium nitride wafer.

2) An electrode was manufactured on a back surface of a P-type doped gallium arsenide wafer, the electrode was made of 15-nm chromium/55-nm gold, and then an obtained sample was sequentially immersed in acetone and isopropanol for surface cleaning. The sample was cleaned with deionized water and then taken out and dried.

3) The P-gallium arsenide wafer was pressed onto the N-gallium nitride wafer, and the two wafers contact each other and move relative to each other to obtain a direct-current generator based on dynamic heterojunction, to generate an electrical signal.

Through a large number of experimental studies, it is found that the thickness of the insulating layer of the direct-current generator according to the present disclosure preferably ranges from 5 nm to 100 nm. The carriers cannot pass when the insulating layer is too thick, and increase of a height of a barrier is limited if the insulating layer is too thin. The insulating layer with an appropriate thickness can greatly increase the output voltage of the generator and reduce the current output to a limited extent. The Si material has higher output current density but a lower voltage; while the gallium arsenide material has lower output current density but a higher voltage. A layered semiconductor material such as molybdenum disulfide has small resistance when sliding, which produces no scratch. Therefore, the semiconductor material can be recycled, to produce continuous direct-current output.

What is claimed is:

1. A direct-current generator based on dynamic semiconductor heterojunction, wherein the direct-current generator comprises a first semiconductor layer (1) and a second semiconductor layer (4); a first electrode (2) is provided on a back surface of the first semiconductor layer (1) and a second electrode (5) is provided on a front surface of the second semiconductor layer (4); a front surface of the first semiconductor layer and a back surface of the second semiconductor layer contact each other by means of an insulating layer (3) provided on a front surface of the first semiconductor layer (1) and are slidable relative to each other to form a dynamic semiconductor heterojunction direct-current generator; and a Fermi level of a material of the first semiconductor layer (1) is different from a Fermi level of a material of the second semiconductor layer (4).

2. The direct-current generator based on dynamic semiconductor heterojunction according to claim 1, wherein each of the first semiconductor layer (1) and the second semiconductor layer (4) is made of a material selected from a group consisting of silicon, gallium arsenide, indium gallium arsenide, zinc oxide, germanium, cadmium telluride, gallium nitride, indium phosphide, and the following two-dimensional layered semiconductor materials; molybdenum disulfide, black phosphorus, tungsten diselenide, molybdenum disulfide, molybdenum diselenide and tungsten disulfide.

3. The direct-current generator based on dynamic semiconductor heterojunction according to claim 1, wherein the insulating layer (3) is made of a material selected from a group consisting of silicon dioxide, silicon nitride, aluminum oxide, aluminum nitride, boron nitride, and hafnium oxide, with a thickness smaller than or equal to 500 nm.

4. The direct-current generator based on dynamic semiconductor heterojunction according to claim 1, wherein each of the first electrode (2) and the second electrode (5) is a composite electrode, which is made of one or more material selected from a group consisting of gold, palladium, copper, silver, titanium, chromium, nickel, platinum and aluminum, with a thickness ranging from 1 nm to 500 nm.

5. The direct-current generator based on dynamic semiconductor heterojunction according to claim 1, wherein the direct-current generator is configured to convert any one of wind energy, tidal energy, human kinetic energy, mechanical energy and ocean energy into a direct-current electrical signal for output.

6. A method for manufacturing a direct-current generator based on dynamic semiconductor heterojunction, wherein the direct-current generator comprises a first semiconductor layer (1) and a second semiconductor layer (4); a first electrode (2) is provided on a back surface of the first semiconductor layer (1) and a second electrode (5) is provided on a front surface of the second semiconductor layer (4); a front surface of the first semiconductor layer and a back surface of the second semiconductor layer contact each other by means of an insulating layer (3) provided on a front surface of the first semiconductor layer (1) and are slidable relative to each other to form a dynamic semiconductor heterojunction direct-current generator; and a Fermi level of a material of the first semiconductor layer (1) is different from a Fermi level of a material of the second semiconductor layer (4), wherein the method comprises steps of:
1. manufacturing the first electrode (2) on the back surface of the first semiconductor (1);
2. growing the insulating layer (3) on the front surface of the first semiconductor (1);
3. manufacturing the second electrode (5) on a back surface of the second semiconductor (4); and
4. pressing a front surface of the second semiconductor (4) onto the insulating layer (3) of the first semiconductor (1) to form a slidable contact, so as to obtain the direct-current generator based on dynamic semiconductor heterojunction; and moving the two semiconductor layers relative to each other to generate a direct-current electrical signal.

* * * * *